(12) United States Patent
Agner et al.

(10) Patent No.: US 7,287,634 B2
(45) Date of Patent: *Oct. 30, 2007

(54) TORQUE TRANSMITTING UNIT AND DRIVE TRAIN FOR IT

(75) Inventors: Ivo Agner, Buhl (DE); Wolfgang Reik, Buhl (DE); Olaf Werner, Buhl (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 55 days.

This patent is subject to a terminal disclaimer.

(21) Appl. No.: 10/905,286

(22) Filed: Dec. 23, 2004

(65) Prior Publication Data

US 2005/0139442 A1 Jun. 30, 2005

(30) Foreign Application Priority Data

Dec. 23, 2003 (DE) ................................ 103 61 491

(51) Int. Cl.
*B60K 17/02* (2006.01)
(52) U.S. Cl. ................. 192/87.11; 192/48.8; 192/70.12
(58) Field of Classification Search ............. 192/87.11, 192/87.14, 87.15
See application file for complete search history.

(56) References Cited

U.S. PATENT DOCUMENTS

| 2,636,585 | A | * | 4/1953 | Livermore | ............... | 192/87.11 |
|---|---|---|---|---|---|---|
| 3,734,259 | A | * | 5/1973 | Ashfield | ................. | 192/113.34 |
| 6,401,894 | B1 | * | 6/2002 | Merkel et al. | ............. | 192/48.9 |
| 6,488,137 | B2 | * | 12/2002 | Katou et al. | ............. | 192/70.12 |
| 6,634,477 | B2 | * | 10/2003 | Beneton et al. | ............ | 192/48.8 |
| 6,675,943 | B2 | * | 1/2004 | Organek et al. | ............... | 192/35 |
| 2004/0173429 | A1 | | 9/2004 | Friedmann | | |
| 2005/0000774 | A1 | * | 1/2005 | Friedmann | .................. | 192/48.8 |
| 2006/0000684 | A1 | * | 1/2006 | Agner et al. | ............... | 192/48.8 |

FOREIGN PATENT DOCUMENTS

| DE | 10033649 | | 2/2001 |
|---|---|---|---|
| DE | 10316445 | A1 | 10/2003 |
| DE | 10316419 | A1 | 11/2003 |
| DE | 10301405 | A1 | 7/2004 |

* cited by examiner

*Primary Examiner*—Richard M Lorence
(74) *Attorney, Agent, or Firm*—Simpson & Simpson, PLLC (57) ABSTRACT

The invention relates to a torque transmission device, especially for a drive train comprising an internal combustion engine and a twin-clutch transmission having two transmission input shafts and one transmission output shaft, each transmission input shaft being connectable to an internal combustion engine via a clutch of the torque transmission device.

34 Claims, 8 Drawing Sheets

TORQUE TRANSMITTING UNIT AND DRIVE TRAIN FOR IT

CROSS-REFERENCE TO RELATED APPLICATION

This patent claims priority of German Patent Application No. 103 61 491.5, filed Dec. 23, 2003, which application is incorporated herein by reference.

BACKGROUND OF THE INVENTION

The invention relates to a torque transmission device, especially for a drive train comprising an internal combustion engine and a twin-clutch transmission having two transmission input shafts and one transmission output shaft, each transmission input shaft being connectable to an internal combustion engine via a clutch of the torque transmission device.

Twin clutch transmissions having two transmission input shafts are known in which a torque transmission device has one wet clutch for each transmission input shaft, the wet clutches being hydrostatically actuated via suitable piston units and the pressure needed for this purpose, and in some cases the pressure for cooling the clutches when necessary, being generated by a hydraulic fluid pump. Pumps of this type have high outputs and consume accordingly great amounts of energy. Rotary transmission leadthroughs having seals that seal between rotating and stationary components are provided between the pump and the piston units for the development of a pressure produced by the pump via a hydraulic fluid for actuating the clutches. Appropriate precautions for the service life of these seals must be taken.

OBJECT OF THE INVENTION

The object of the present invention is the improvement of a torque transmission device and a drive train to the effect that it is possible to transmit a high output power of the internal combustion engine via the clutches of the two transmission input shafts while consuming little energy while a simple and safe operation of the clutches at a high transmission output power over a long service life is simultaneously possible. Moreover, the production costs are to be low and the manufacture and assembly simple.

BRIEF SUMMARY OF THE INVENTION

The objective is achieved via a torque transmission device in the drive train of a motor vehicle for the transmission of torque between an internal combustion engine having a crankshaft and a twin-clutch transmission having at least two transmission input shafts with two friction clutches, employing the features described below.

Each transmission input shaft is coupleable to the crankshaft via a friction clutch. The mounting of the transmission input shafts may be concentric, with a second transmission input shaft designed as a hollow shaft disposed around a first transmission shaft, or be with transmission input shafts arranged parallel to each other.

Each friction clutch is provided with friction units on the driving and driven ends that may act on each other via an axial pressure along a rotational axis of at least one of the transmission input shafts to form a frictional engagement as friction partners. For example, disks that are driven by an input part and act on an output part may be stacked alternately to form a multi-disk assembly, it being possible for the driven-end and/or driving-end disks to have friction linings in order to increase the friction coefficient of the friction partners.

The friction units of the two friction clutches are preferably mounted radially one over the other, but may, in appropriately designed drive train spaces, be axially spaced from each other and have equal or different diameters. In order to provide a uniform transmission performance of the two friction clutches, the frictional power of the two friction clutches may be harmonized with each other; for example, the annular frictional partners of the radially outer friction clutches may have a slight difference between inner and outer diameter, and/or the friction unit of the radially outer friction clutch may have fewer friction elements. The selection of different friction materials may also be advantageous.

The friction units of each friction clutch are moved against a stop via an actuation part assigned to each particular frictional unit. At the actuation part, it is also possible to provide a disk or lever part that is attached to a rotating, axially fixed part of the clutch and may swivel in relation to it and, when acted on in the axial direction, presses the friction partners of the driving end and driven end against a stop so that the friction clutch at first slips and then sticks. It may be advantageous to compress the friction clutch only to a certain extent, that is, to engage it until the desired torque is transmitted from the internal combustion engine to the corresponding transmission input shaft.

Mounted with the actuation part of each friction clutch is an actuation device that is rotationally fixedly joined to a stationary housing part, an actuation bearing being interposed between them, and acts axially on each particular actuation part; both friction clutches are operated in a wet operating mode. In this way an actuation system without rotary transmission leadthroughs may be proposed because the hydraulic operative connection pressure supply device/stationary line/rotational line/pressure piston for acting on the clutch—as is known from twin clutches of the prior art—may be bypassed by means of a mechanical actuation bearing for the rotational decoupling of actuation device and clutch. In this way a torque transmission system is also available whose friction clutches may be equipped with the appropriate actuation system, independent of the actuation of the twin-clutch transmission, whether hydraulic, pneumatic, by means of electrical actuators or a combination thereof.

A torque transmission device having an actuation device that is electro-hydraulic may therefore be advantageous. In this context, at least one actuation device may be formed of a hydraulic master device, which comprises a piston/cylinder unit and is actuated by an electric motor, at least one hydraulic slave device, which comprises a piston/cylinder unit, acting axially on the corresponding actuation bearing and a hydraulic fluid line linking master and slave devices. The slave device may have a plurality of subunits distributed around the circumference of at least one transmission input shift for acting on an actuation bearing, both slave devices having subunits distributed around the circumference for acting on both friction clutches, and it being possible to mount them alternately distributed around the circumference and on an approximately equal circumference. Alternatively, a slave device for a friction clutch may comprise a pressurizable annular cylinder having disposed therein an axially displaceable annular piston, it being possible for each of two slave devices radially disposed one over the other to act on a friction clutch. A system in which the one outer annular piston is mounted in an axially displaceable and sealing manner on a radially interior annular piston, a separate pressure chamber being provided for both pistons so that both clutches may be actuated independently of each other.

Especially for drive trains having an hydraulically actuated twin-clutch transmission comprising a pump and a control section to control the hydraulic components of the shifter, it may be advantageous to incorporate slave devices for acting on the actuation bearing directly in a wall of the transmission housing, whereby they are controlled by the control section with pressure supplied by the pump and actuate the clutches. It may be advantageous to use a system of this type also for a single clutch in conjunction with a hydraulically controlled automatic transmission, such as an automated shift transmission (ASG) or a continuously variable transmission (CVT). In this context, a piston/cylinder unit may be accommodated in the wall of the transmission and/or in the corresponding control section, or at least one piston may be placed in an axially displaceable manner within a cylinder that is incorporated in the housing wall or the control section.

A further exemplary embodiment may provide an electromechanical actuation device, an electromotive rotary drive unit that is disposed essentially perpendicular to one of the transmission input shafts acting on at least one friction clutch, the rotary movement being converted via a transmission into a translatory movement along one of the transmission input shafts to act on the corresponding actuation bearing. The German patent application having the file number 103 40 528.3, whose contents are fully incorporated by reference into the present application, is cited in this regard. Alternatively, an electromotive rotary drive mechanism that is disposed essentially parallel to or concentric with one of the transmission input shafts may act on at least one friction clutch, the rotary movement being converted via a transmission into a translatory one along this transmission input shaft to act on the corresponding actuation bearing. The published German patent application 100 33 649 A1, for example, is mentioned in this regard.

Obviously, the two friction clutches being operated in wet operating mode in special applications may be normally engaged clutches that are disengaged when an axial force is applied. However, in standard applications, these friction clutches are compressed clutches; that is, they are disengaged while they are not being acted on by the actuation device and are engaged by being acted one with an axial force.

Especially advantageous is the actuation of the clutches that are operated in wet mode with an actuation device of the proposed embodiments that is independent of the speed of the internal combustion engine in conjunction with a so-called start/stop device in which the internal combustion engine is immobilized while the vehicle is stationary or driving downhill and when there is a load requirement, especially via the gas pedal, the internal combustion engine is started and with at least one clutch the drive is started or continued. While clutches actuated by means of a pump must be moved from the completely disengaged state after the start of the internal combustion engine and the subsequent pressure buildup by the pump from this position back to the engagement point and then, once friction moment can be transmitted to the transmission, an operation of this type occurs more quickly in the actuation devices according to the invention because, independent of the operating state of the internal combustion engine, at least one clutch may be kept at the engagement point and, after the start of the internal combustion engine, a torque that is transferable to the transmission via this clutch is immediately available.

To cool at least one of the friction clutches, especially if a great frictional heat is produced by slip, it may be advantageous to provide a flow of coolant via a pump for cooling at least one friction clutch. For a mode of operation that is essentially independent of the transmission, this pump may be disposed in the area of a clutch bell housing formed between a wall of the internal combustion engine and a wall of the twin-clutch transmission. In this context a flow of coolant may be sucked in from an oil sump that is shared with the transmission or from the transmission itself, or a separate oil circulation for the friction clutches may be provided. It may also be advantageous, especially if there is no hydraulic pump to control the transmission, to configure the output of the pump in such a manner that the flow of coolant may be provided. The pump may be driven by the crankshaft or a component connected thereto. For example, when the pump is mounted on the transmission housing, a clutch component may be geared with the pump in the vicinity of the transmission. In an advantageous way, this involves a component joined to the disk carrier that drives the internal gear of an internal-gear pump disposed radially further to the outside by means of a gear wheel, the internal-gear pump being advantageously disposed within an area that conserves space, for example, between two transmission lugs of the transmission. In this context, the pump may be disposed on a housing wall of the transmission and, depending specifically on the particular transmission concept, within the space of the clutch bell housing or in the transmission space. Also an integration in the housing wall or, when there is a common space with the transmission, in a corresponding fixture of the common space may be advantageous. Of course, the pump may also be electrically driven. The drive by the crankshaft or an electric motor may be produced via a gear connection, a belt drive, a chain drive or the like.

The internal-gear pump may be driven via an internal gear having an internal toothing, this internal toothing meshing with an external toothing of a sun gear and a suction crescent being provided to suck in the coolant. In an advantageous manner, the sun gear may be radially supported via its external toothing on a complementary segment of the suction crescent so that a separate mounting of the sun gear may be eliminated. If desired, the use of a gerotor pump may also be advantageous. To minimize the required power of the pump, its flow volume may be controlled via a suction throttling, it being possible to produce the suction throttling via an electromagnetic valve. In this way, a flow volume may, for example, be proportional up to a predetermined speed of the drive speed and starting at a limit speed be kept at a constant value. Historical values have shown that a limitation of the coolant pressure to 5 bar, preferably 3 bar, and a flow volume of no more than 36 l/min, preferably 24 l/min, may be advantageous. In an advantageous manner, an oil cooler may be connected between a pump and the friction units of the friction clutches. The coolant may leak into the sump through an appropriate opening in the chamber, whereby it may be advantageous to use a scoop tube that is fixedly mounted on the housing to collect coolant that has been forced radially outward due to centrifugal force and conduct it into the sump. A scoop tube of this type may advantageously be combined with other functional elements, such as a slave unit, into one component. Of course, for special applications, other pumps, such as radial piston pumps, vane pumps, diaphragm pumps and the like may also be advantageous.

According to the theory of the invention, the entire clutch bell housing may be filled with coolant or hydraulic fluid, such as commercially available ATF; a space shared with the transmission may also be provided. However, it is especially advantageous if a separate chamber sealed off in a fluid-tight manner from the clutch bell housing is formed in the clutch bell housing between a wall of the internal combustion engine and a wall of the twin-clutch transmission, in which chamber at least the two friction clutches are housed. These chambers may be formed by a component that encompasses both friction clutches, for example, a pot-shaped input part such as a disk carrier, it being possible to rotatably mount a part connected thereto on a stationary part, such as a component of the actuation device or of the transmission housing, in a leak-proof manner. Alternatively, to form the chamber, a disk part may be firmly attached to the transmission housing and be swiveling and fluid tight on a rotating part, such as on the hub of an input part.

The assembly of the two friction clutches according to the invention may be designed as a component that is directly held on the crankshaft. In this context, the actuation system may also be mounted directly on this unit and when assembled may be rotationally fixedly joined to the transmission to form a torque damper, the individual clutch assemblies being joined to and mounted on the actuation system in swiveling manner. In further exemplary embodiments, the clutch assembly may be held and supported on the crankshaft, while the actuation device is premounted on the transmission housing. The coolant pump may be premounted simultaneously with the actuation device. An axial or radial mounting of them on the transmission housing may be provided.

To reduce or eliminate torsional vibrations migrating from the internal combustion engine into the transmission, a dual-mass flywheel disposed between crankshaft and input part of the two friction clutches may be provided on the torque transmission device. This dual-mass flywheel may be integrated into the chamber filled with hydraulic fluid or be mounted outside the chamber. The dual-mass flywheel may also form a part of the housing for the chamber and/or have a drive part for the pump. The holding of the dual-mass flywheel on the crankshaft may be accomplished via an axially flexible disk part of a so-called "flexplate". Of course, the torque transmission device without a dual-mass flywheel may also be held in this manner on the crankshaft. It may be especially advantageous, in conjunction with the mass ratios of a twin clutch, to form two masses that swivel against at least an energy accumulator acting in the circumferential direction and are on the driven and driving side of the flywheel so that they are coupleable with each other at least temporarily, the coupling being accomplished via a friction device that depends on centrifugal force. The use of a coupling with mass ratios in which the driving side moment of inertia is greater than that of the driven side may be especially advantageous, for example, a first coupleable mass having a moment of inertia of $0.1\pm0.04$ kgm$^2$ on the driving side and a second mass on the driven side has a moment of inertia of $0.04+0.04$ kgm$^2$. It has also proven advantageous to sustain the two masses up to a range from 1200 to 1800 rpm.

The assembly of the torque transmission device may be provided in such a way that the complete module comprising slave device and in some cases a dual-mass flywheel is held on one or both transmission input shafts of the twin-clutch transmission and, when the internal combustion engine and transmission are joined, is rotationally fixedly connected to an axially flexible drive component that is joined to the crankshaft, such as a "flexplate". It may also be advantageous to connect parts of the dual-mass flywheel or the entire dual-mass flywheel to the crankshaft separately from the clutch unit and to produce a connection between internal combustion engine and transmission via fasteners, such as plug and socket connectors, that permit an axial displaceability and a rotationally fixed entrainment of the connected parts. To guide the torque transmission device, a pilot bearing may be provided on it by means of which the torque transmission device is held on the crankshaft in a swiveling manner. An axial support of the torque transmission device on the crankshaft via, for example, a friction bearing, may also be advantageous. It may be especially advantageous to adjust the torque transmission device or its axially displaceable components in the assembly in a merely coarse manner, to connect the actuation device to the transmission housing in a rotationally fixed, but axially displaceable manner and, when operating the torque transmission device for the first time, to finally position it via a self-regulating, axially acting pressure of the coolant on the axially displaceable components, for example, by running them against suitably disposed stops.

BRIEF DESCRIPTION OF THE DRAWINGS

The invention is explained in detail in relation to the following figures. Shown are.

DETAILED DESCRIPTION OF THE INVENTION

Figure 1:
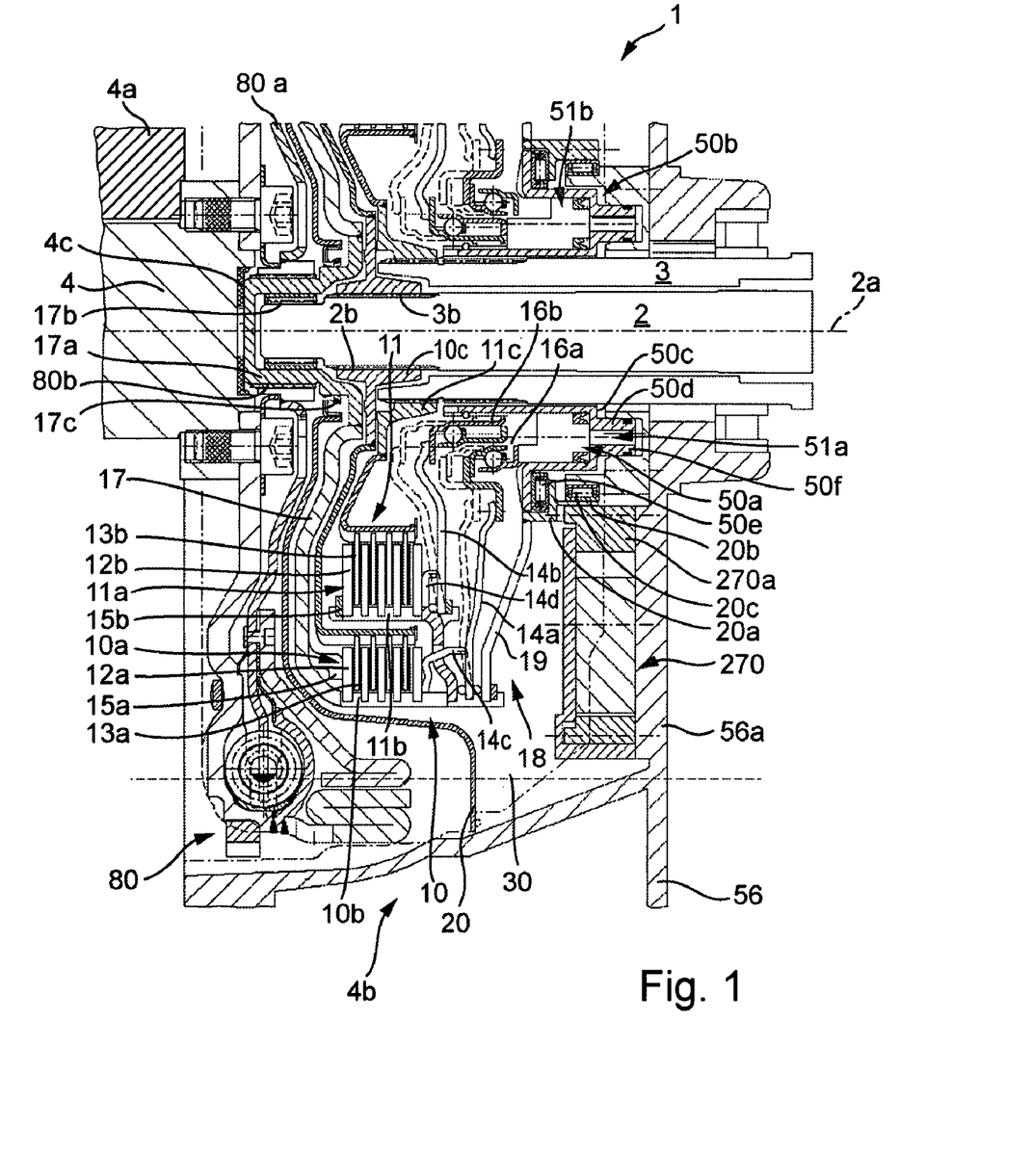
FIG. 1 is a partial section of a torque transmission device.

FIG. 1 shows a partial section of a torque transmission device 1 as a twin clutch in the drive train of a motor vehicle, comprising a drive unit (not shown) having a crankshaft 4 swivel-mounted in a wall 4a of the engine housing and a twin-clutch transmission having a first transmission shaft 2 rotating about a rotational axis 2a and a second transmission input shaft 3 that is formed in the shown exemplary embodiment as a hollow shaft. Torque transmission device 1 is housed in a so-called clutch bell housing 4b, which together with wall 4a forms an enclosed space. Torque transmission device 1 is subdivided into two friction clutches 10, 11 having friction units 10a and 11a disposed radially one over the other. Each friction clutch 10, 11 is rotationally connected via an input part 10b, 11b to crankshaft 4 and via an output part 10c, 11c to one transmission input shaft 2, 3 each. In the power flow between input parts 10b, 11b and output parts 10c, 11c, the two clutches 10, 11 are each assigned friction partners 12a, 12b or 13a, 13b, each of these forming a multi-disk assembly assigned to the corresponding clutch 10, 11 that comprises friction partners 12a, 12b, which are rotationally fixedly joined to input part 10b, 11b, and friction partners 13a and 13b, which are rotationally fixedly joined to output part 10c, 11c. The number of friction partners and the disposition of metallic and non-metallic friction surfaces may be configured according to appropriate requirements, whereby it may be especially advantageous if all of the available friction surfaces of both friction clutches 10, 11 are designed in such a manner that a practically equal transmissible torque via both clutches results. This may be accomplished, for example, via a differing number of friction partners 12a, 12b and 13a, 13b and/or via appropriately differing radial ring widths of the friction surfaces. However, it may also be advantageous in special embodiments, for example, in a twin-clutch transmission having a preferred starting gear on a transmission input shaft 2, 3, to provide the clutch assigned to this transmission input shaft with a correspondingly greater transmission capacity. Of course, the friction surfaces are formed from the sum of the areas of all friction partners.

Figure 2:
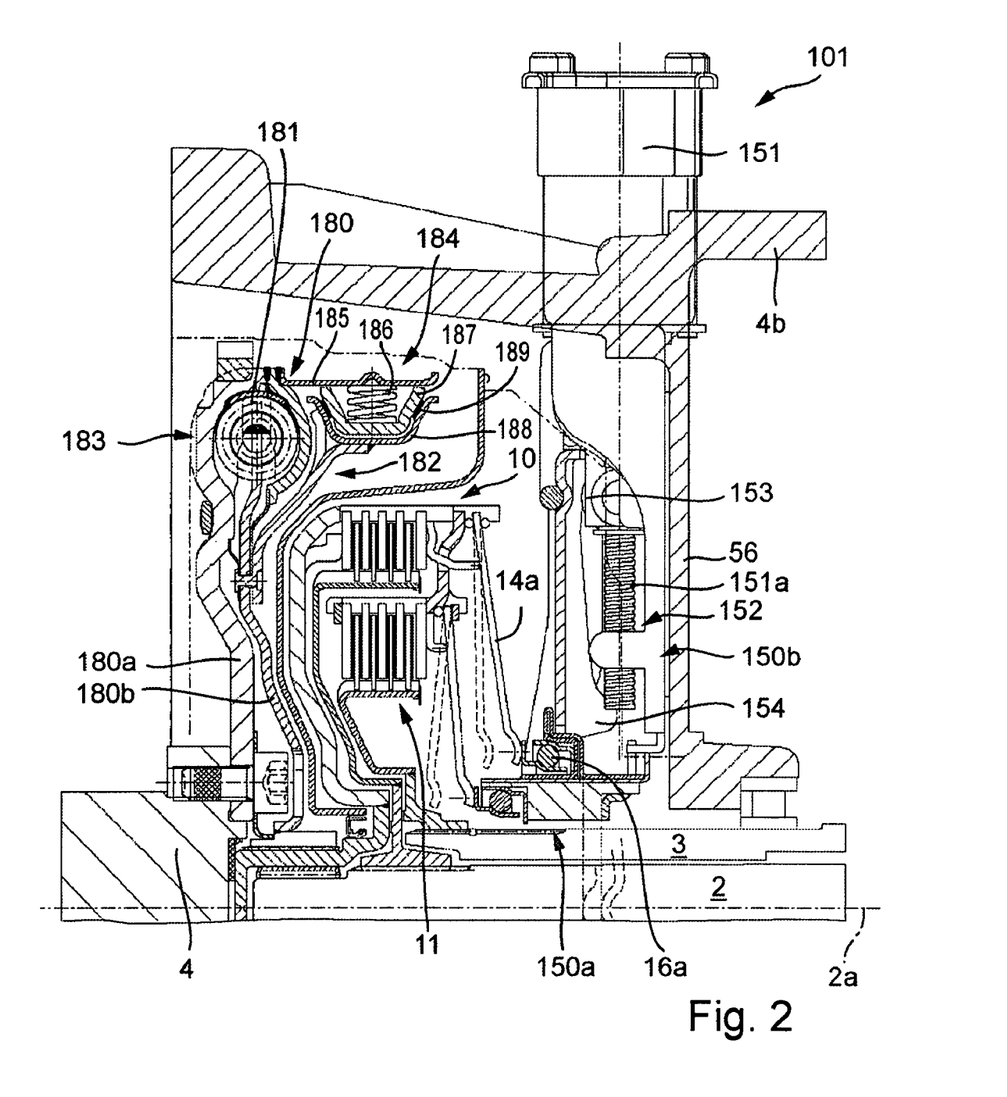
FIG. 2 is a partial section of a torque transmission device.

The coupling of drive shaft 4 and transmission input shafts 2,3 is accomplished via axial compression of friction partners 12a, 12b, 13a, 13b, each via an actuation part 14a, 14b assigned to a clutch 10, 11, against a stop 15a, 15b provided on the opposite side of actuation parts 14a, 14b. Stops 15a, 15b may be formed of a retaining ring that is axially fixedly joined to the input or output part or formed of lugs that are appropriately molded into the input or output part and may be designed in an annular configuration or distributed around the circumference. The actuation parts 14a, 14b are preferably formed on input parts 10b, 11b of friction clutches 10, 11 as—seen physically—single-armed levers and preferably technically seen as components having a force rim and tabs or similar disk parts that connect to each other distributed around the circumference, the solid lines in FIG. 2 showing the idle position when clutch 10, 11 is disengaged and broken lines showing actuation parts 14a, 14b with clutch 10, 11 in the engaged position. Actuation parts 14a, 14b act on friction units 10a, 11a via an impinging element 14c, 14d, which is disposed between actuation part 14a, 14b and a friction partner 12a, 12b so that when there is an increase in actuation, that is, axial displacement of the radial interior side of actuation parts 14a, 14b with a simultaneously axially fixed twisting at the outer end corresponding to an axial lever, an axial relative travel is transmitted to friction units 10a, ha so that with increasing travel friction clutches 10, 11 transmit an increasing torque from crankshaft 4 to the particular assigned transmission input shaft 2, 3. The transmission of torque is accomplished, for example, via a toothing 2b, 3b between the particular transmission input shaft 2, 3 and output parts 10c, 11c of friction clutches 10, 11. The output parts in this context may be integrally formed as forged, sintered or cast parts, as sheet metal parts or be formed from a combination of these, it being possible to weld or rivet these parts together. Actuation parts 14a, 14b are preferably plate parts punched and/or stamped out of metal, which may be formed out of spring steel and/or accordingly may be turned up at their ends for provision of an elastic property. To increase the resistance to wear, they may be hardened. Actuation parts 14a, 14b, turn at the same speed as the input parts of the clutch so that actuation devices 50a, 50b for the actuation of actuation parts 14a, 14b therefore must be torsionally decoupled from them via actuation bearings 16a, 16b. The example shown involves so-called compressed friction clutches 10, 11 that are disengaged in the relaxed state of actuation devices 50a, 50b and are engaged, that is they transmit torque, as actuation of actuation parts 14a, 14b increases. Of course, still other exemplary embodiments may be advantageous, in which the clutch is pressed into the engaged state via—seen from a physical perspective—two-arm actuation parts and, is pushed open when the actuation parts are actuated via actuation devices 50a, 50b. In this case, actuation bearings 16a, 16b would be so-called release bearings, while, in the shown exemplary embodiment, they are to be called engagement bearings. Actuation devices 50a, 50b are formed in the depicted exemplary embodiment as hydraulic slave units 51a, 51b that are axially displaced from outside by buildup of a pressure, for example, via a pump unit or via a master cylinder, which in turn may be acted on electromotively, and act on the friction clutches via actuation bearings 16a, 16b and actuation parts 14a, 14b. Preferably, a plurality of slave devices 51a, 51b are provided for each friction clutch 10, 11 in such a manner that they can act on the actuation bearings 16a, 16b, which are located radially one over the other, even though they are disposed at approximately one diameter around the circumference. A sealing of chamber 30 from the hydraulic slave devices 51a, 51b is accomplished opposite transmission housing 56 on the side of axial collar 50d of housing 50c by means of seals, as shown here by 50f.

Torque transmission device 1 is provided in such a way that it may be mounted as a module on the dual-mass flywheel 80, which is rotationally fixedly joined to crankshaft 4.

For this purpose, actuation devices 50a, 50b are fixedly swivel-mounted on a disk-shaped component so that housing 50c of actuation devices 50a, 50b may be rotationally fixedly mounted on a wall of the twin-clutch transmission. In this context, common housing 50c is joined to slave devices 51a, 51b via at least one collar 50d in an appropriate recess of the transmission or in such a manner that the torque produced by the load moments of actuation bearings 16a, 16b may be supported on the housing. Furthermore, a bearing 50e, such as a rolling bearing or friction bearing, that stabilizes the actuation force within the clutch so that practically no axial forces are introduced into the transmission housing is provided between housing 50c and receptacle 20a for accommodating transmission housing 50c.

The friction clutches 10, 11 are preferably friction clutches that run wet, which means that they are intended for operation in the oil bath. To this end, it may be advantageous if both clutches have a common input part 17 that is preferably formed with a pot shape on one side so that a housing 18 for friction units 10a, 11a that is open on one side is produced. Common input part 17 may be designed as a formed sheet metal part and have a recess in the area of rotation axis 2a in which an axial collar 17a made of another material, such as a hardened material, is placed providing for the centering of the clutch on one of the two transmission input shafts 2, 3 (shown here: transmission input shaft 2). For this purpose, a pilot bearing 17b may be provided between transmission input shaft 2 and axial collar 17a. Moreover, on the outer circumference of collar 17a, a rotationally connected contact with output part 80a of dual-mass flywheel 80 is provided, for example, as a plug and socket connection 80b for mounting torque transmission device 1 on the dual-mass flywheel. Moreover, axial collar 17a with interposition of a bearing, such as friction bearing 4c, forms the stop of torque transmission device 1 on the crankshaft 4.

The axial clearance between torque transmission device 1 and crankshaft 4 is set in such a manner that, when actuation devices 50a, 50b are first actuated, torque transmission device 1 is distanced from transmission housing 56 along collars 50d via pressure buildup of slave devices 51a, 51b, and/or a pressure is built up in chamber 30, which is at least partially filled with the coolant.

In the shown exemplary embodiment, provision is made that dual-mass flywheel 80 and wet clutches 10, 11 are isolated from each other so that the dual-mass flywheel may be continuously operated dry and friction clutches 10, 11 may be continuously operated wet. For this purpose, a disk part 20, such as a diaphragm, is provided that is sealed off from clutch bell housing 4b and from input part 17, in this case, for example, on axial collar 17a, by means of a seal 17c.

To cool the oil contained in chamber 30, a pump 270, which as a gear pump is driven by input part 17 of friction clutches 10, 11, is contained within clutch bell housing 4b. For this purpose, on component 19, which is connected to input part 17, receptacle 20a, which is connected thereto, is provided with an axial collar 20b that is supported in a swiveling manner at its interior circumference via bearing 20c and at its exterior circumference drives internal gear 272, the pump housing being fixedly attached to transmission housing 56. The more detailed explanation of the operation of pump 270 is given in FIG. 4. The oil that is located in the sump, which is advantageously shared with the transmission, is pumped by pump 270 in the direction of friction partners 12a, 12b, 13a, 13b, it being possible to control the delivery rate of the pump as a function of the frictional energy that is registered. Of course, in this operation lubricant may also be provided to lubrication points of the clutch area that require lubrication.

FIG. 2 shows a torque transmission device 101 comprising friction clutches 10, 11 that are similar to each other and are able to transmit a torque from crankshaft 4 to transmission input shafts 2, 3. What is different in this case is the type of actuation device 150a, 150b. Actuation devices 150a, 150b are set at an angle in relation to axis of rotation 2a, so that just actuation device 150b is shown in detail. However, actuation device 150a is essentially intended for the same function Actuation device 150a comprises a rotary drive 151, which may be mounted outside of clutch bell housing 4b and drives a spindle 151. Spindle 151a together with a cam lobe 153 forms a mechanism 152, the cam lobe being supported against transmission housing 56 and radially displaced as a result of the rotary movement of spindle 151a via rotary drive 151. Cam lobe 153 in this context acts on lever 154, which is clamped in a swiveling way on one side and is provided in the radial direction with an axial profile so that when spindle 151a is turned by rotary drive 151 it produces an axial displacement of profiled lever 154, which acts on engagement bearing 114a and thereby operates actuation part 116a so that a clutch actuation as indicated in FIG. 1 occurs. Actuation devices 150a and 150b are described in detail and further explained in German Patent Application 103 40 528 A1.

Another inventive concept is provided in FIG. 2 on dual-mass flywheel 180. Dual-mass flywheel 180 is designed in such a way that a first mass 183 is directly joined on the primary side to crankshaft 4 and a second mass 182 can swivel against the action of an energy accumulator 181 in relation to the first mass. However, in special cases it may be disadvantageous to keep this swiveling capability unrestricted. Therefore between the two masses a friction device 184 is provided that joins masses 182 183 to each other by the self-regulating frictional force. For this purpose, an essentially annular, axially cantilevering collar 185—on whose interior circumference radially displaceable friction elements 187, which together with an annular part 188 that is U-shaped in cross-section on output part 180b of dual-mass flywheel 180, preferably with friction linings 189 interposed, form a frictional connection and thereby join the two masses 182 and 183 together, are distributed around the circumference and act against an energy accumulator 186 that acts radially inward—is provided on input part 180a of dual-mass flywheel 180 with mass 183. In this way the operation of dual mass flywheel 180, up to a given speed of crankshaft 4, is reduced to the function of a simple flywheel. At higher speeds, because of the centrifugal force, a displacement of friction elements 187 against the spring force of energy accumulator 186 occurs and dual masses 182 and 193 maintain a swiveling capability against the actions of energy accumulator 181 so that the function of a dual-mass flywheel is satisfied. In this context, the mass of friction elements 187 and the spring force of energy accumulator 186 may be coordinated in such a manner that friction elements 187 are released at a desired speed of crankshaft 4. Preferably, the two masses 182, 183 are decoupled at speeds higher than the idle speed.

Figures 3, 4, 5:
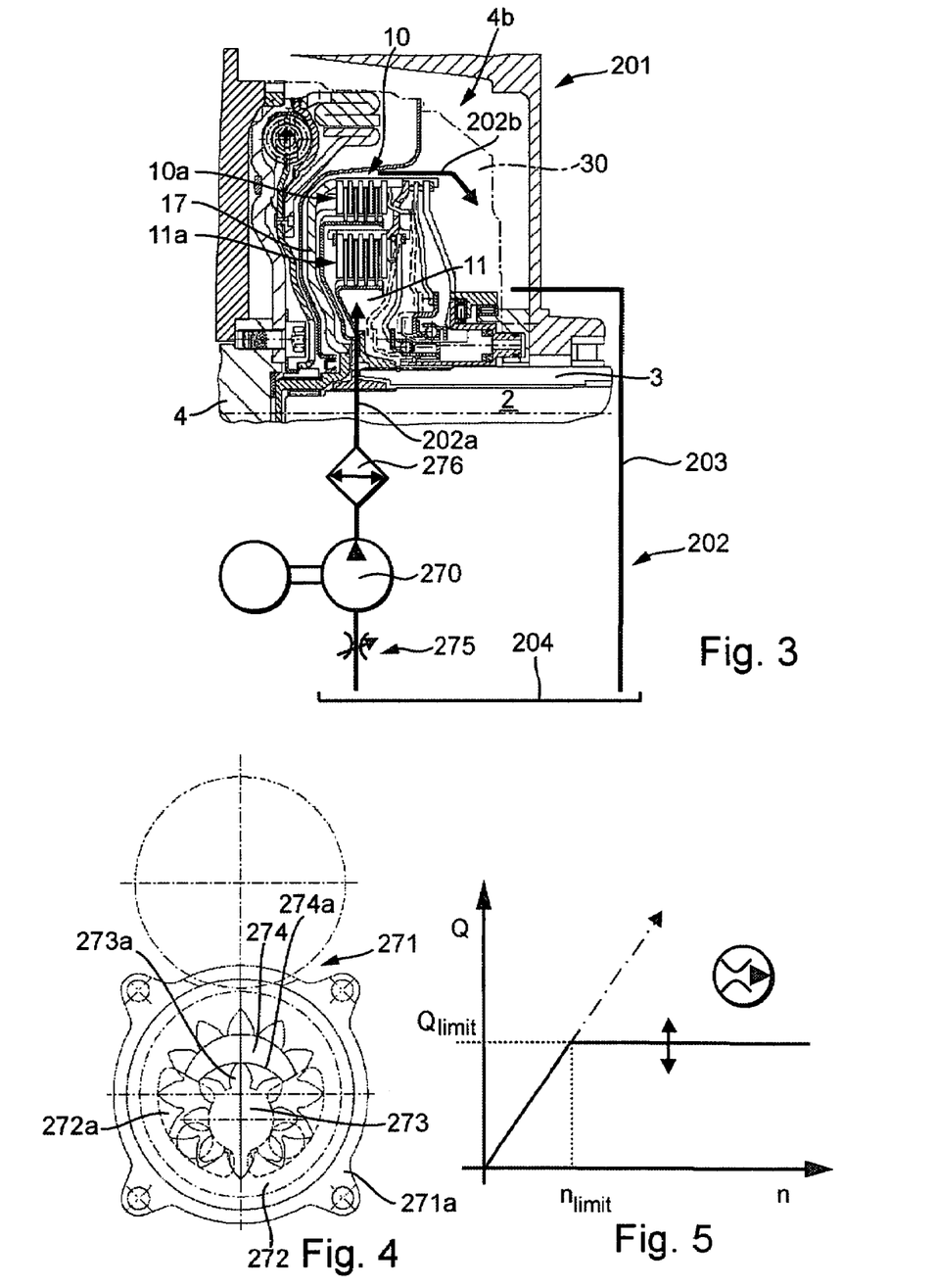
FIG. 3 is a partial section having a schematically depicted link to a cooling circuit.
FIG. 4 is a section through a pump.
FIG. 5 is a diagram to represent the flow volume as a function of a drive speed of the pump.

FIG. 3 shows a torque transmission device 201 similar to torque transmission device 1 in FIG. 1 having a schematically depicted circuit of an hydraulic device 202 for cooling the friction partners of friction clutches 10, 11. The oil or coolant is applied to the two clutches via an oil cooler 276 by means of a pump 270, such as the pump integrated in clutch bell housing in FIG. 1, which may be an internal-gear pump 271 (FIG. 4) and which may be driven by torque transmission device 201, for example, via input part 17 of the two friction clutches 10, 11. It may be advantageous to configure the coolant flow in such a manner that it preferably occurs first on the clutch 10, 11 with which the vehicle is predominantly started. Supported by the centrifugal force, the oil is delivered by the friction clutches, radially through friction units 10a, 11a, preferably along arrows 202a, 202b and the friction heat generated by a speed differential of crankshaft 4 and transmission input shafts 2 during a slip phase is compensated. From chamber 30, the coolant flows out through the schematically illustrated line 203 into a depressurized sump 204 from which it is brought back into the hydraulic circuit for the cooling of clutches 10, 11.

It has been shown that it may be especially advantageous, for example, in order to save energy, to provide the pump with a flow volume control valve 275 by means of which the flow volume is adapted to the cooling requirement of clutches 10, 11. The flow volume control valve may, for example, be electrically controlled and controlled as a function of the speed of one of the shafts 2, 3, 4. For this purpose FIG. 5, shows a corresponding diagram in which flow volume Q is shown as a function of speed N of crankshaft 4. The proportional characteristic between flow volume Q and speed N when pump 270 is coupled to input part 17 of torque transmission device 201 may be limited to a flow volume $Q_{limit}$ by the flow volume limiting valve or suction throttle at a predetermined speed limit $N_{limit}$. In the simplest case, the flow volume limiting valve is comprised of a suction throttle. Moreover, an alternative control of the flow volume limiting valve may occur in such a manner that the so-called slip speed is used as a controlled variable, the slip being determined from the speed of each transmission input shaft 2, 3 and crankshaft 4. From this a flow volume of the hydraulic fluid may be related back to the cooling requirement of clutches 10, 11.

FIG. 4 shows an advantageous exemplary embodiment of an internal-gear pump 271 that is usable directly in the interior of chamber 30, on site so to speak. Internal-gear pump 271 has a housing 271a that is immovably mounted, for example, on a wall 56a of transmission housing 56 (FIG. 1). An internal gear 272 is provided radially adjacent to the interior circumference and is driven by a rotating component, such as collar 20b of FIG. 1. With the Internal toothing 272a disposed on the internal circumference of internal gear 272, internal gear 272 meshes with external toothing 273a of sun gear 273 to produce the pumping action. Suction crescent 274 separates the vacuum side from the pressure side and via a sector 274a forms a mounting or centering for sun gear 273 via its outer circumferences of outer toothing 273a, so that it is not separately mounted. This type of system and design of a gear pump and its drive is not limited to the use of a coolant flow for cooling a clutch, rather an arrangement of this type may also be provided for the pressure supply device for the actuation of clutches and gears, for example, of automated shift transmissions, automatic multi-step transmissions, for the adjustment of regulating cylinders of continuously variable transmissions and for the actuation of dry or wet friction clutches, such as twin clutches and converter lockup clutches.

Figure 6:
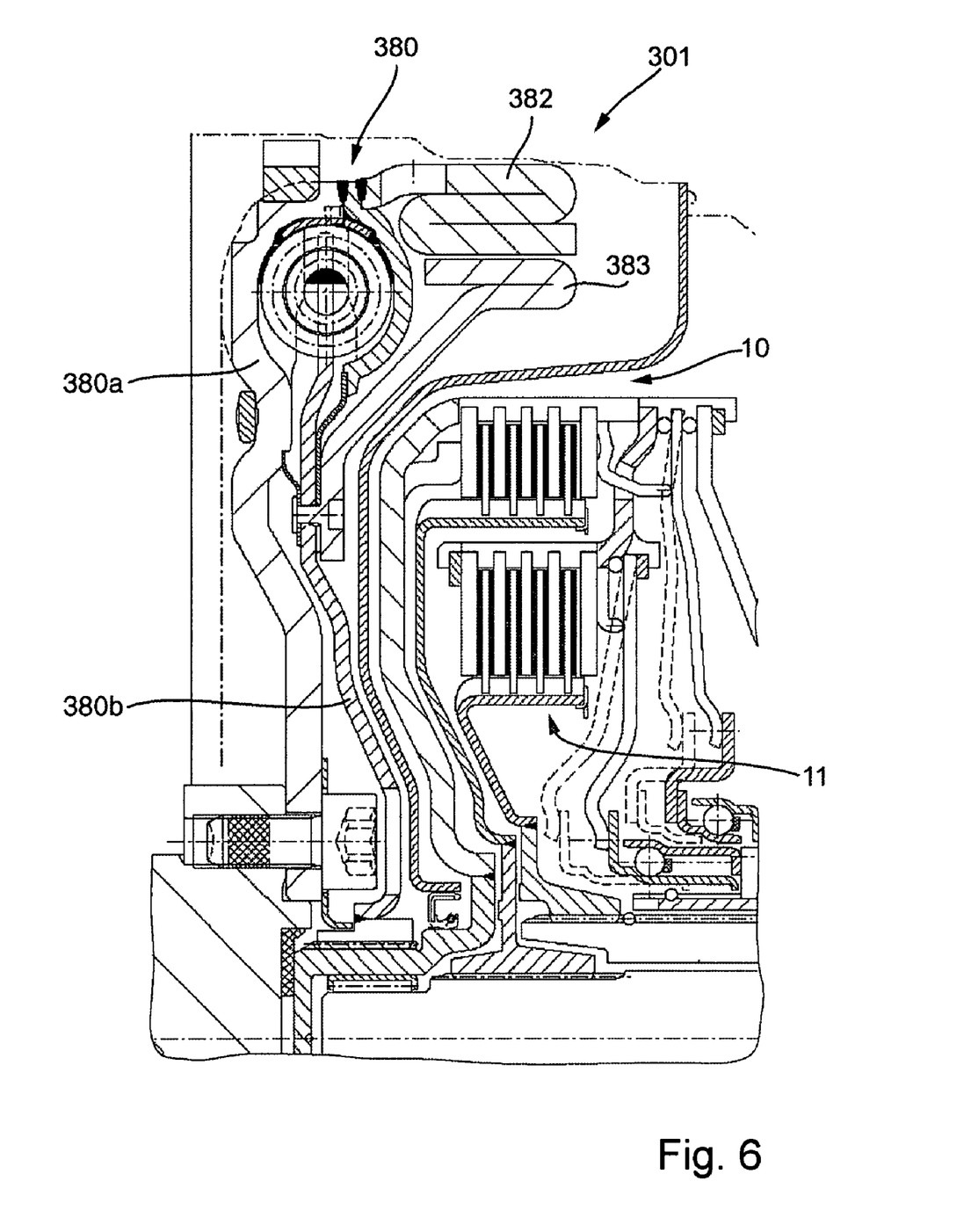
FIG. 6 is a partial section of a torque transmission device.

FIG. 6 shows a torque transmission device 301 having a modified dual-mass flywheel 380 and two friction clutches 10, 11 as a partial section. In a dual-mass flywheel 380, first and second masses 382, 383 are advantageously formed as sheet metal parts and are essentially axially aligned with input part 380a or output part 380b in such a manner that the integrally formed masses 382, 383 are disposed essentially radially above clutches 10, 11.

Figure 7:
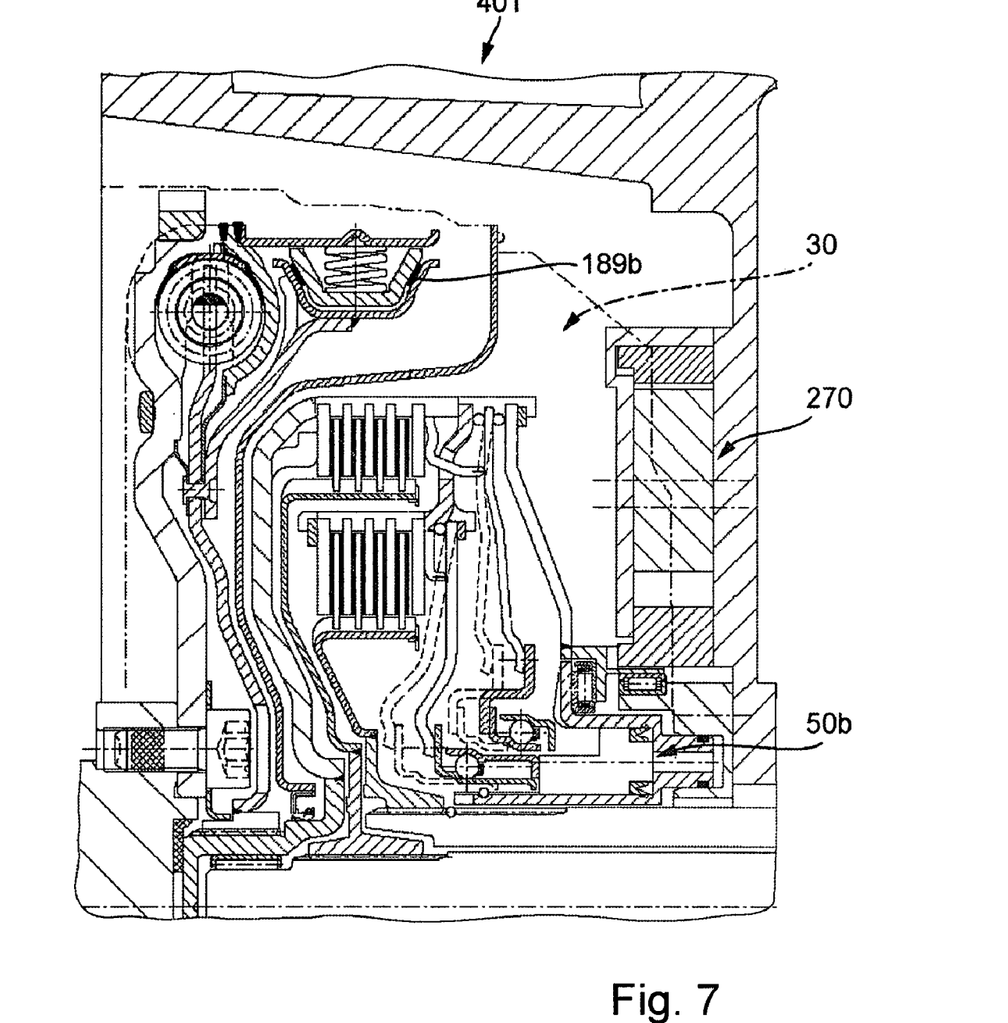
FIG. 7 is a partial section of a torque transmission device.

FIG. 7 shows a partial section of a torque transmission device 401 that is spaced from torque transmission device 101 of FIG. 2 in such a way that an hydraulic release system in the form of actuation devices 50a, 50b—as described in detail in FIG. 1—is used instead of actuation devices 150a, 150b in the form of lever clutch controllers. Only actuation device 50b is illustrated in this section. Moreover, torque transmission device 401 has a pump 270 disposed within chamber 30, which is filled with coolant, as was already explained in detail in FIG. 1 and in FIGS. 3-5.

Figure 8:
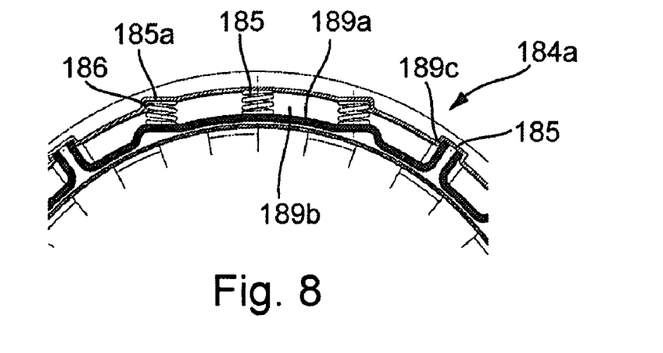
FIG. 8 is a detailed view of the exemplary embodiment shown in FIG. 7.
Figure 9:
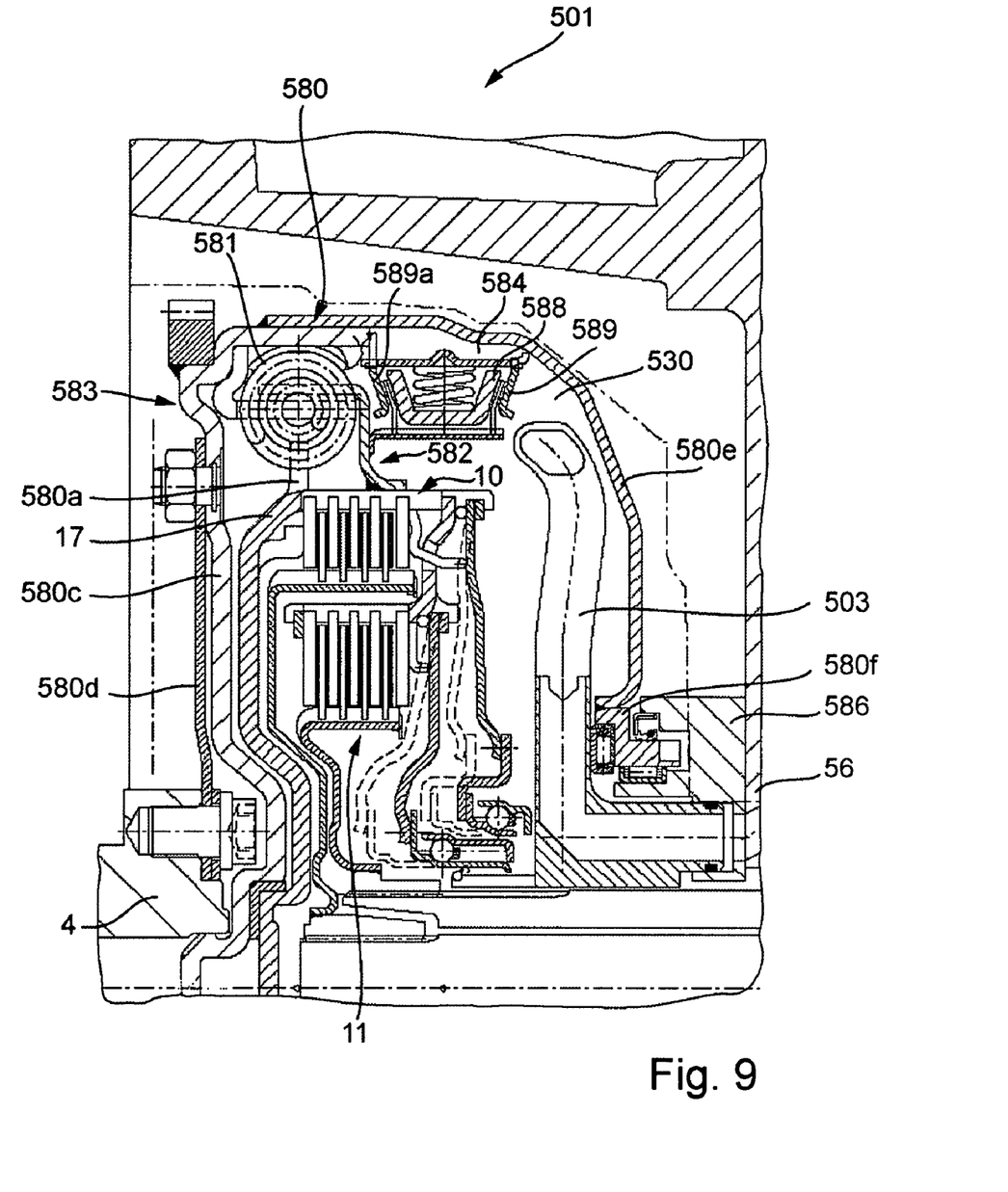
FIG. 9 is a partial section of a torque transmission device.

FIG. 8 shows a detail of an embodiment of friction device 184a for coupling the two masses of a dual-mass flywheel that is modified from devices 184 of FIG. 2 and 584 of FIG. 9. For this purpose recesses for energy accumulator 186 are provided, for example, impressed in annular collar 185. Energy accumulators 186 act on radially limited, displaceable friction segments 189a that form a frictional connection with a friction surface 189b located within the cone of friction segments 189a, which is merely intimated, when pretensioned via energy accumulators 186 (see FIG. 7). Friction linings may be disposed on friction segments 189a or on the opposing friction surface. Another exemplary embodiment may in particular be provided for low friction values in wet clutches in a multi-disk design in which a friction disk that is rotationally fixedly joined to a first mass component is in two-sided frictional contact with components of the other component to be joined via the frictional connection with the first mass component (see FIG. 9). As a result of centrifugal force, friction segments 189a—as shown in FIG. 8—are shifted radially outward and abut annular collar 185. In order to avoid a shifting of friction segments 189a in the circumferential direction when the friction torque is applied, a stop 189c that is expanded radially to the outside and is extended into an indentation 185b that is expanded radially to the outside is provided on the annular segments and limits the travel of friction segments 189a in the radial direction when there is a radially outward shift of friction segments 189a due to centrifugal force. Of course, friction devices 184a of this type may also be provided with friction devices that are radially to the outside and any desired flywheel masses may connect with each other. Preferably, the coupling may also be by electrical machines with one or both masses of a dual-mass flywheel.

FIG. 9 shows a partial section of a torque transmission device 501 having a dual-mass flywheel 580, comprising masses 582, 583 that are limited in their swiveling by the counteraction of energy accumulator 581 and is integrated in chamber 530, which is filled with coolant. To couple the two masses 582, 583, a friction device 584 is provided that is distinguished from the previously described friction device 184 of FIG. 1 in that friction element 589 is formed as a so-called friction disk having two friction surfaces, each of which forms a frictional contact, respectively, with components 589a on the input end and with annular part 588. Friction element 589 is rotationally fixedly mounted on the output side portion of flywheel 580. Energy accumulators 581 are provided radially to the outside of friction clutches 10, 11. Input part 580c of dual-mass flywheel 580, which is joined to crankshaft 4 via an axially elastic element 580d, acts on energy accumulator 851 from radially outward, while output part 580a of the dual-mass flywheel transmits the torque registered in dual mass flywheel 580 to input part 17, which is common to both clutches 10, 11. In this context, output part 580a may be directly joined, for example, welded to the input part. To form closed chamber 530, a pot-shaped component 580e—which is connected radially toward the inside to a retainer part 580f, which is held and centered by a retainer 586 that is fixedly connected to transmission housing 56—is provided on the outer circumference of input part 580c. Also provided in chamber 530A is a scoop tube 503, which collects coolant forced outward by centrifugal force and conducts it to sump 204 (FIG. 3) in order for it to be available again to hydraulic circuit 202 (FIG. 3) for cooling clutches 10, 11. The drive of the pump via retainer 580f or pot-shaped component 580e is not depicted.

Figure 10:
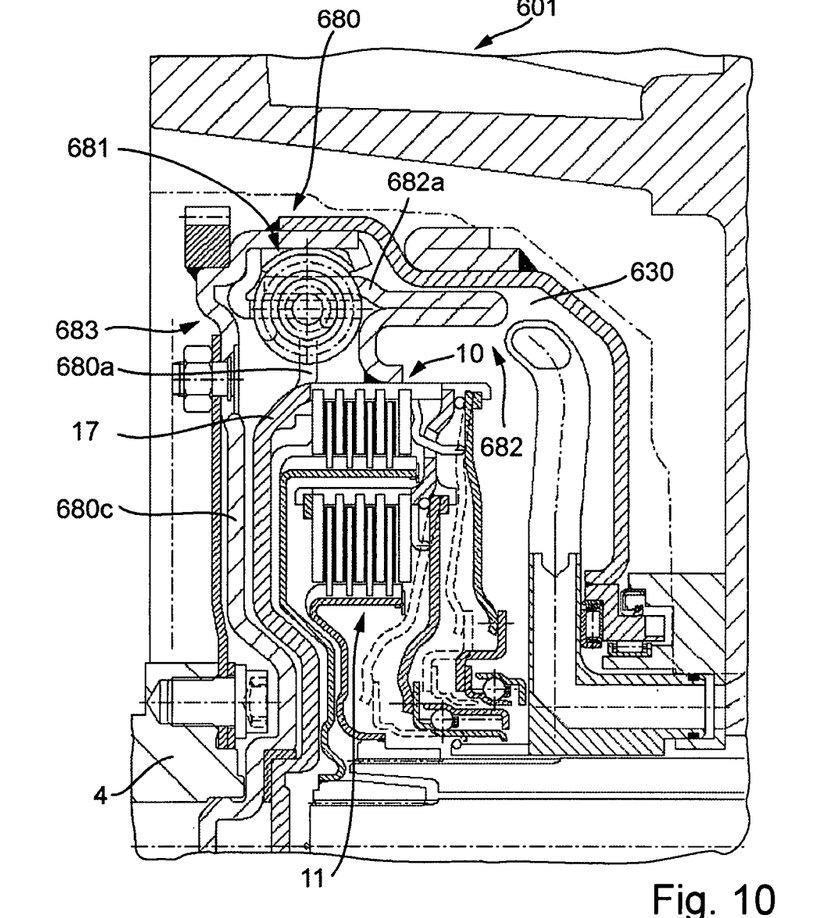
FIG. 10 is a partial section of a torque transmission device.

FIG. 10 shows a partial section of an embodiment of a torque transmission device 601 that is a slightly modified version of torque transmission device 501 of FIG. 9. Dual-mass flywheel 680, likewise disposed in coolant-filled chamber 630 in this context is formed without a friction device for connecting the two masses 682, 683, mass 682 being formed in such a manner that it is fixedly connected to input part 17 of clutches 10, 11 and with an axial integrally formed collar 682a is acted on directly by the energy accumulators and the torque transmitted via crankshaft 4 and input part 680c to energy accumulators 681 is transmitted to input part 17. In this context, an additional output part 680a, which is also directly joined to input part 17 of clutch 10, 11, is able to engage in energy accumulators 681. Advantageously, this output part 680a may be formed from input part 17 in that suitable tabs are provided. In this context, collar 682a and output part 680a are able to act on different groups of energy accumulator 681, and/or parts 680a, 682a may act in opposition to input part 680c when there are different swiveling angles of the movement relative to input part 680c against energy accumulator 681 so that a two-stage characteristic of dual-mass flywheel 680 may be provided.

Figure 11:
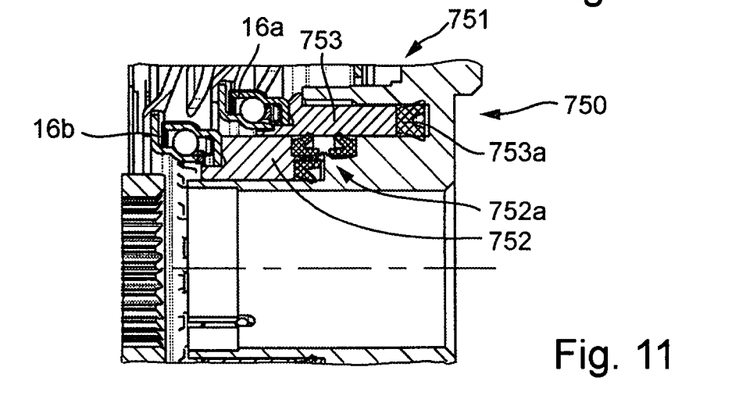
FIG. 11 shows an actuation device for a friction clutch.

FIG. 11 shows an advantageous actuation device 750 for the two friction clutches 10, 11 of the previously described torque transmission devices having a slave device 751 to which are assigned two annular pistons 752, 753 that are mounted one directly above the other and radially one over the other. In this context, pistons 752, 753 are each axially displaced by a pressure applied from the outside to a chamber 752a, 753a, whereupon pistons 752, 753 actuate actuation parts 14a, 14b (FIG. 1) via actuation bearings 16a, 16b and thereby engage the clutch. In this context the engagement of clutch 10, 11 occurs against a self-regulating restoring force via the elasticity of actuation parts 14a, 14b so that when there is a drop in pressure in chambers 752a, 753a the clutches are automatically disengaged again. Of course the restoring force for engaging the clutches may also be provided via suitable energy accumulator materials, such as coil springs, at a different place, for example, in the master cylinder provided for pressurization.

Figure 12:
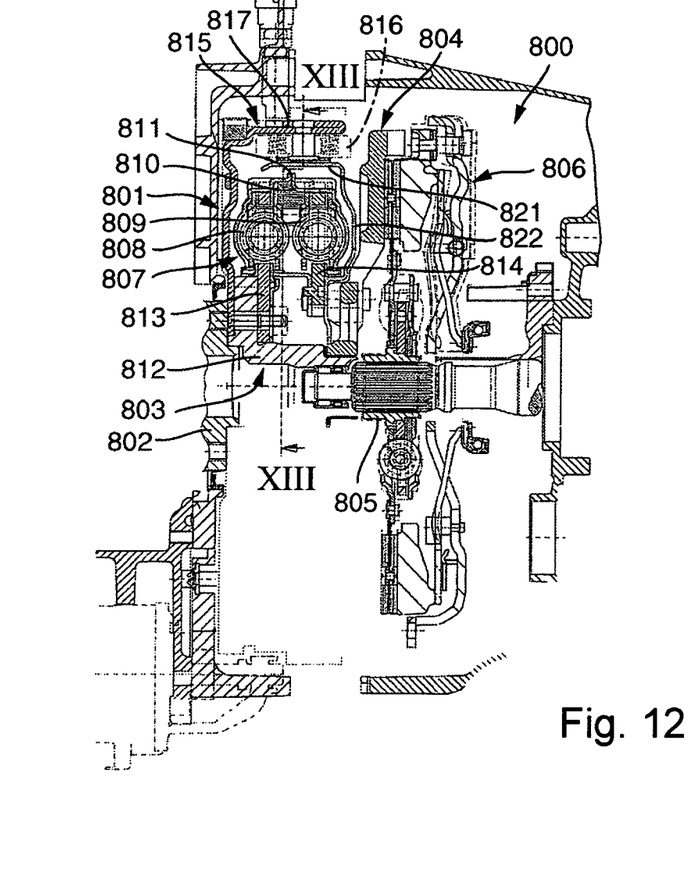
FIGS. 12 and 13 show an especially advantageous design of a torque transmission device having a damping device that may be used in connection with both single clutches and twin clutches.
Figure 13:
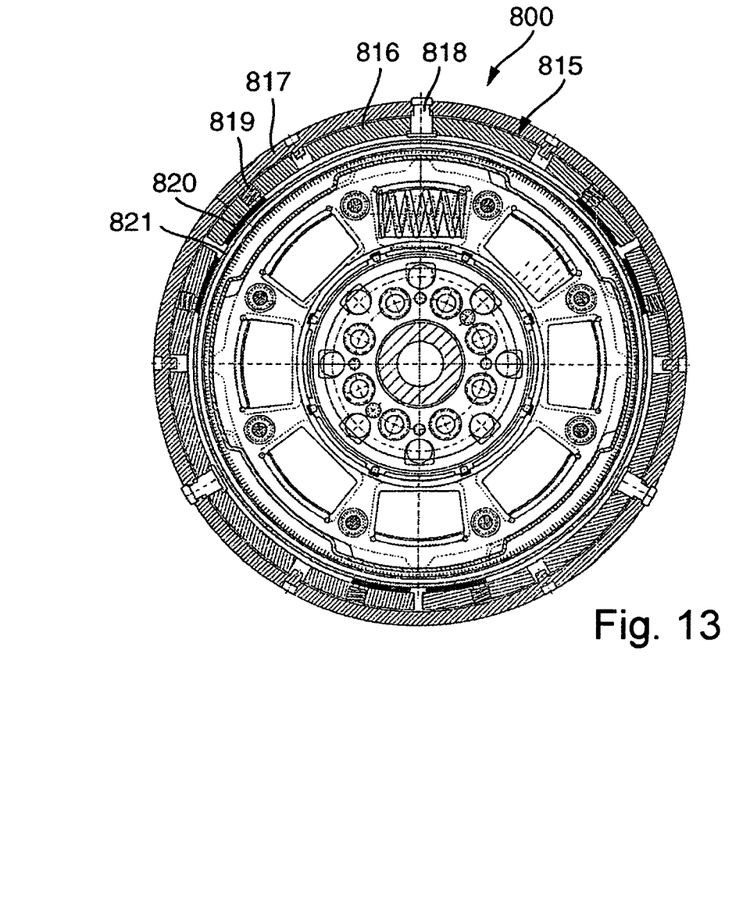

Torque transmission device 800, which is illustrated in FIGS. 12 and 13, comprises a torsional-vibration damper 801, which has a primary part 803 that is connectable to output shaft 802 of an engine and a secondary part 804 that swivels in relation to it. Primary part 803 and secondary part 804 form flywheels that have a corresponding moment of inertia. A friction clutch 806 is held on secondary part 804, a clutch disk 805 being interposed. A torsionally elastic damper 807 is provided between primary part 803 and secondary part 804 and has two spring groups 808 and 809 connected in series, which in this case are held in a chamber 811 formed by sheet metal parts 810. Chamber 811 may preferably be filled at least partially with a lubricant. The two spring groups 808 and 809 are axially disposed one behind the other and practically at the same diameter. Primary part 803 possesses an axial collar 812 on which secondary part 804 is swivel-mounted, and specifically in this case via a friction bearing. The in-line connection of spring groups 808, 809 is accomplished in the illustrated exemplary embodiment via disk-shaped components that have corresponding recesses for springs 808 and 809 and in this case are rotationally connected to sheet metal parts 810, which delimit chamber 811. The input part of the torsionally elastic damper is formed by a flange-like component 813, which is rotationally connected to primary part 803. The output part of the torsionally elastic damper 801 is also formed by a flange-like component 814, which is rotationally connected to secondary part 804.

As is evident in FIG. 13, sheet metal parts 810 forming chamber 811 and impingement disks joined thereto are disposed in a floating mount in relation to primary or input part 803 and secondary or output part 804, which therefore means they swivel in relation to these two parts.

Moreover, a friction clutch or friction device 815 that also functions as a converter lockup clutch at low speeds, for example, below the idle speed of the engine, is provided between the two parts 803 and 804 formed as inertial bodies or flywheel masses. Friction clutch 815 has flyweights 816 that are carried by an axial collar 817 of primary part 803. In the illustrated exemplary embodiment, radial guide pins 818 are provided for this purpose on axial collar 817. Flyweights 816, which are formed around the circumference as segments, are pressed radially inward via springs 819 that are pretensioned and in this case are supported via friction linings or friction areas 820 against an axial collar 821 that is carried by secondary part 804 (at least below a certain speed). In the depicted exemplary embodiment, axial collar 821 is formed by a pot-shaped formed sheet metal part 822 that is rotationally fixedly joined to secondary part 804.

Friction clutch or converter lockup clutch 815 acts parallel to torsionally elastic damper 801 so that it may be bypassed corresponding to the design or pretensioning of spring 819, at least starting at a specific minimum speed. In this way, among other things, the resonance problems present when starting the engine may in particular be overcome.

Because of the relatively large angular dimension of the segment-type flyweights 816, they have strengthening effect like a braking band. In the depicted exemplary embodiment, three flyweights 816 of this type are provided that are seen each extending practically 120 degrees around the circumference.

From FIG. 12 it is evident that secondary part 804 carries only a single clutch. However, a twin clutch, such as is described in connection with the other figures, could also be provided in place of single clutch 806.

PARTS LIST

1 Torque transmission device
2 Transmission input shaft
2a Axis of rotation
2b Toothing
3 Transmission input shaft
3b Toothing
4 Crankshaft
4a Wall
4b Clutch bell housing
4c Seal
10 Friction clutch
10a Friction unit
10b Input part
10c Output part
11 Friction clutch
11 a Friction unit
11b Input part
11c Output part
12a Friction partner
12b Friction partner
13a Friction partner
13b Friction partner
14a Actuation part
14b Actuation part
14c Impinging element
14d Impinging element
15a Stop
15b Stop
16a Actuation bearing
16b Actuation bearing
17 Input part
17a Axial collar
17b Pilot bearing
17c Seal
18 Housing
19 Component
20 Disk part
20a Aufnahme
20b Collar
30 Chamber
50a Actuation device
50b Actuation device
50c Housing
50d Collar
50e Bearing
50f Seal
51a Slave device
51b Slave device
56 Transmission housing
56a Wall
80 Dual-mass flywheel 80a Output part
80b Plug and socket connection
101 Torque transmission device
114a Engagement bearing
116a Actuation part
150a Actuation device
150b Actuation device
151 Rotary drive
151a Spindle
152 Mechanism
153 Cam lobe
154 Profiled lever
180 Dual-mass flywheel
180a Input part
180b Output part
181 Energy accumulator
182 Mass
183 Mass
184 Friction device
184a Friction device
185 Annular collar
185b Indentation
186 Energy accumulator
187 Friction element
188 Annular part
189 Friction lining
189a Friction segment
189b Friction surface
189c Stop
201 Torque transmission device
202 Hydraulic device
202a Arrow
202b Arrow
203 Line
204 Sump
270 Pump
271 Internal-gear pump
271a Housing
272 Internal gear
272a Internal toothing
273 Sun gear
273a Outer toothing
274 Suction crescent
274a Segment
275 Flow volume limiting valve
276 Oil cooler
Q Flow volume
N Speed
301 Torque transmission device
380 Dual-mass flywheel
380a Input part
380b Output part
382 Mass
383 Mass
401 Torque transmission device
501 Torque transmission device
503 Scoop tube
530 Chamber
580 Dual-mass flywheel
580a Output part
580c Input part
580d Elastic element
580e Pot-shaped component
580f Retainer part
581 Energy accumulator
582 Mass
583 Mass
584 Friction device
586 Retainer
588 Annular part
589 Friction lining
589a Components
601 Torque transmission device
630 Chamber
680 Dual-mass flywheel
680a Output part
680c Input part
681 Energy accumulator
682 Mass
682a Collar
683 Mass
750 Actuation device
751 Slave device
752 Annular piston
752a Chamber
753 Annular piston
753a Chamber
800 Torque transmission device
801 Torsional vibration damper
802 Output shaft
803 Primary part
804 Secondary part
805 Clutch disk
806 Friction clutch
807 Torsionally elastic damper
808 Spring groups
809 Spring groups
810 Sheet metal parts
811 Chamber
812 Axial collar
813 Flange-type component
814 Flange-type component
815 Friction clutch
816 Flyweight
817 Axial collar
818 Guide pins
819 Springs
820 Friction linings
821 Axial collar
822 Formed sheet metal parts

What is claimed is:

1. A torque transmission device (1, 101, 201, 301, 401, 501, 601) in a drive train of a motor vehicle for the transmission of torque between an internal combustion engine having a crankshaft (4) and a twin-clutch transmission comprising at least two transmission input shafts (2, 3) with two friction clutches (10, 11) wherein:

each transmission input shaft (2, 3) is coupleable to the crankshaft (4) via a friction clutch (10, 11);

each friction clutch (10, 11) is provided with friction units (10a, 11a) on a driving end and on a driven end that may act on each other a via an axial pressure along a rotational axis (2a) of at least one of the transmission input shafts (2, 3) to form a frictional engagement;

the friction units (10, 11a) are formed of a plurality of friction partners (12a, 12b, 13a, 13b) that alternate as layers in the axial direction on a driving side and on a driven side;

the friction units (10a, 11a) of each friction clutch (10, 11) are acted on against a stop (15a, 15b) via an actuation part (14a, 14b) assigned to each friction unit;

mounted with the actuation part (14a, 14b) of each friction clutch (10, 11) is an actuation device (50a, 50b, 150a) that is rotationally fixedly joined to a stationary housing part (56), an actuation bearing (16*a*, 16*b*) being interposed therein, and acts axially on each particular actuation part (14*a*, 14*b*);

both friction clutches (10, 11) are operated in wet operating mode;

the friction clutches (10,11) are radially concentrically disposed with respect to each other;

input part (10*b*) of the outer friction clutch (10) is rotationally connected to input part (11*b*) of the inner friction clutch (11) and is arranged to transmit torque to the input part (11*b*); and, input part (11*b*) of the inner friction clutch (11) is radially centered via the rotational connection of parts (10*b*) and (11*b*).

2. The torque transmission device (1, 201, 301, 401, 501, 601) as described in claim 1, wherein at least one actuation device is an electro-hydraulic actuation device (50*a*, 50*b*, 750).

3. The torque transmission device (1, 201, 301, 401, 501, 601) as described in claim 2, wherein at least one actuation device (50*a*, 50*b*, 750) is a hydraulic device.

4. The torque transmission device (1, 201, 301, 401, 501, 601) as described in claim 3, wherein the at least one actuation device (50*a*, 50*b*) has a plurality of slave devices (51*a*, 51*b*) distribute the circumference of said transmission input shafts (2, 3) for acting on an actuation bearing (16*a*, 16*b*).

5. The torque transmission device (1, 201, 301, 401, 501, 601) as described in claim 4, wherein both said actuation devices (50*a*, 50*b*) have slave devices (51*a*, 51*b*) distributed around the circumference and disposed in relation to their assignment to the actuation devices alternately distributed around the circumference and on the same circumference.

6. The torque transmission device as described in claim 3, wherein the at least one actuation device (750) has a slave device (751) disposed around a transmission input shaft having an annular piston (752, 753) to act on an actuation bearing (16*a*, 16*b*).

7. The torque transmission device as described by claim 1, wherein at least one actuation device has at least one slave device that is maintained and controlled by a control section for the hydraulic control of transmission steps.

8. The torque transmission device as described in claim 7, wherein the at least one slave device is accommodated in a housing wall of the twin-clutch transmission.

9. The torque transmission device as described in claim 8, wherein at least one cylinder for the at least one slave device is formed from the housing wall, and an axially displaceable piston that acts on the corresponding actuation bearing is accommodated in the cylinder.

10. The torque transmission device (201) as described in claim 1, wherein at least one actuation device is an electromechanical actuation device (150*b*).

11. The torque transmission device (101) as described in claim 10, wherein at least one friction clutch (10, 11) is acted on via an electromotive rotary drive (151) disposed essentially perpendicular to one of the transmission input shafts (2, 3), the rotary movement being converted by means of a mechanism (152) into a translatory movement along one of the transmission input shafts (2, 3) to act on the corresponding actuation bearing.

12. The torque transmission device as described in claim 10, wherein at least one friction clutch (10, 11) is acted on via an electromotive rotary drive disposed essentially parallel to one of the transmission input shafts (2, 3), the rotary movement being converted by means of a mechanism into a translatory movement along this transmission input shaft to act on the corresponding actuation bearing.

13. The torque transmission device (1, 201, 401) as recited in claim 1 wherein a coolant flow for cooling at least one friction clutch (10, 11) is provided by a pump (270) that is disposed in the area of a wall (56*a*) of the twin-clutch transmission that faces a clutch bell housing (4*b*).

14. The torque transmission device (1, 201, 401) as described in claim 13, wherein the pump (270) is used exclusively for the provision of the coolant flow.

15. The torque transmission device (1, 201, 401) as described in claim 14, wherein the pump (270) is driven by the crankshaft (4) or a component (19) connected thereto.

16. The torque transmission device (1, 201, 401), especially as described in claim 13, wherein the pump (270) is an internal-gear pump (271) comprising an internal gear (272) having an internal toothing (272*a*) with which a sun gear meshes with an outer toothing (273*a*), a suction crescent (274) being provided to suction the coolant, and the sun gear (273) being radially mounted via its outer toothing (273*a*) on a segment (274*a*) of the suction crescent (274) that is complementary to it.

17. The torque transmission device (1, 201, 401) as described in claim 16, wherein the internal gear (272) is driven by a drive component (20*b*).

18. The torque transmission device (201) as described in claim 13, wherein a volume flow produced by the pump (270) is controlled via a suction throttling (275).

19. The torque transmission device (201) as described in claim 18, wherein the control is implemented via an electromagnetic valve.

20. The torque transmission device (201) as described in claim 13, wherein an oil cooler (276) is connected between pump (270) and the friction units (10*a*, 11*a*).

21. The torque transmission device (201), especially as described in claim 13, wherein a separate chamber (30, 530) that is sealed off fluid tight from the clutch bell housing (4*b*) and in which at least the two friction clutches (10, 11) are housed is formed in the clutch bell housing between a wall (4*a*) of the internal combustion engine and a wall (56*a*) of the dual-clutch transmission.

22. The torque transmission device (501) as described in claim 1, wherein both friction clutches (10, 11) are radially encompassed by a driving side component (580*c*, 580*e*) that is provided as an input part (17) for the two friction clutches (10, 11).

23. The torque transmission device as described in claim 22, wherein the input part (17) is formed as a pot shape and part of a housing is provided for sealing off a chamber (530) from a clutch bell housing.

24. The torque transmission device (1, 101, 201, 301, 401, 501, 601) as described in claim 22, wherein a dual-mass flywheel (80, 180, 380, 580, 680) is provided between the crankshaft (4) and the input part (17) of the two friction clutches (10, 11).

25. The torque transmission device (501, 601) as described in claim 24, wherein the dual-mass flywheel (580, 680) is integrated in the chamber (530, 630).

26. The torque transmission device (1, 101, 201, 301, 401) as described in claim 24, wherein the dual-mass flywheel (80, 180, 380) is disposed outside the chamber (30).

27. The torque transmission device (101, 401, 501) as described in claim 25, wherein two masses (182, 183, 482, 483, 582, 583) swiveling against at least one energy accumulator (181, 481, 581) that acts in the circumferential direction are coupleable with each other at least temporarily.

28. The torque transmission device (101, 401, 501) as described in claim 27, wherein the coupling is accomplished via a friction device (184, 584) that depends on centrifugal force.

29. The torque transmission device (101, 401, 501) as described in claim 27, wherein a first, driving side coupleable mass has a moment of inertia of $0.1 \pm 0.04$ kgm$^2$ and a second driving side mass has a moment of inertia of $0.04 \pm 0.04$ kgm$^2$.

30. The torque transmission device (101, 401, 501) as described in claim 29, wherein the coupling of the two masses is operational up to a range from 1200 to 1800 rpm.

31. A twin-clutch transmission having a torque transmission device (1, 101, 201, 301, 401, 501, 601) as set forth in claim 1.

32. A drive train having an internal combustion engine and a twin-clutch transmission having a torque transmission device (1, 101, 201, 301, 401, 501, 601) disposed between them as set forth in claim 1.

33. Torque transmission device (1, 201, 301, 401, 501, 601) as described in claim 1, wherein an upstream input part (17) in the power flow from the engine to the input part (10*b*) of the outer friction clutch, is designed in one piece with said input part (10*b*).

34. Torque transmission device (1, 101, 201, 301, 401, 501, 601) as described in claim 1, wherein the actuation parts (14*a*, 14*b*) are designed as one of disc springs and lever arrangements.

* * * * *

UNITED STATES PATENT AND TRADEMARK OFFICE
CERTIFICATE OF CORRECTION

PATENT NO. : 7,287,634 B2
APPLICATION NO. : 10/905286
DATED : October 30, 2007
INVENTOR(S) : Ivo Agner, Wolfgang Reik and Olaf Werner It is certified that error appears in the above-identified patent and that said Letters Patent is hereby corrected as shown below:

In Claim 1, the word "a" was inadvertently add to line 8 and in line 14, "a" was inadvertently left off of reference numeral 10.

A correct version of Claim 1 from line 1 to line 20 is presented below:

Col. 16, Line 45 should read:

1. A torque transmission device (1, 101, 201, 301, 401, 501, 601) in a drive train of a motor vehicle for the transmission of torque between an internal combustion engine having a crankshaft (4) and a twin-clutch transmission comprising at least two transmission input shafts (2, 3) with two friction clutches (10, 11) wherein:
 each transmission input shaft (2, 3) is coupleable to the crankshaft (4) via a friction clutch (10, 11);
 each friction clutch (10, 11) is provided with friction units (10a, 11a) on a driving end and on a driven end that may act on each other [a] via an axial pressure along a rotational axis (2a) of at least one of the transmission input shafts (2, 3) to form a frictional engagement;
 the friction units (10<u>a</u>, 11a) are formed of a plurality of friction partners (12a, 12b, 13a, 13b) that alternate as layers in the axial direction on a driving side and on a driven side;

Signed and Sealed this

Third Day of June, 2008

JON W. DUDAS
*Director of the United States Patent and Trademark Office*